US012654479B2

(12) United States Patent
Oliva Ventayol et al.

(10) Patent No.: US 12,654,479 B2
(45) Date of Patent: Jun. 16, 2026

(54) SUBLIMATION OF PRINTED TEXTILE MEDIA

(71) Applicant: Hewlett-Packard Development Company, L.P., Spring, TX (US)

(72) Inventors: Xavier Oliva Ventayol, Sant Cugat del Valles (ES); Francisco Lopez Moral, Sant Cugat del Valles (ES); Vito Di Virgilio, Sant Cugat del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 150 days.

(21) Appl. No.: 18/552,229

(22) PCT Filed: Mar. 26, 2021

(86) PCT No.: PCT/US2021/024357
§ 371 (c)(1),
(2) Date: Sep. 25, 2023

(87) PCT Pub. No.: WO2022/203681
PCT Pub. Date: Sep. 29, 2022

(65) Prior Publication Data

US 2024/0300255 A1 Sep. 12, 2024

(51) Int. Cl.
*B41M 5/035* (2006.01)
*B41F 16/00* (2006.01)
*B41F 16/02* (2006.01)

(52) U.S. Cl.
CPC ....... *B41M 5/0358* (2013.01); *B41F 16/0046* (2013.01); *B41F 16/02* (2013.01)

(58) Field of Classification Search
CPC ... B41F 16/0046; B41F 16/02; B41M 5/0358; D06P 5/004
See application file for complete search history.

(56) References Cited

U.S. PATENT DOCUMENTS 3,949,574 A 4/1976 Donovan
4,242,092 A 12/1980 Glover
9,120,326 B2 9/2015 Will et al.
9,840,073 B2 12/2017 Ihme et al.
(Continued)

FOREIGN PATENT DOCUMENTS

CN 211616969 * 10/2020
CN 211616969 U 10/2020
(Continued)

OTHER PUBLICATIONS

Abstract of CN211616969.*
(Continued)

*Primary Examiner* — Sonya M Sengupta
(74) *Attorney, Agent, or Firm* — Jordan IP Law, LLC

(57) ABSTRACT

Methods and apparatus for sublimation printing are described, in which a printed textile medium with a sublimating printing substance on a print side is positioned in correspondence with a heating device, with the print side facing away from the heating device, and a negative pressure is caused on the print side of the textile medium, to cause heated air to flow through the printed textile medium thereby sublimating the sublimating printing substance on the printed textile medium.

15 Claims, 6 Drawing Sheets

(56) References Cited

U.S. PATENT DOCUMENTS

| | | | | |
|---|---|---|---|---|
| 10,369,815 | B2 | 8/2019 | Cloots | |
| 2006/0201349 | A1* | 9/2006 | Roberts | B41M 5/0358 101/35 |
| 2019/0193446 | A1* | 6/2019 | Ramsden | B41M 5/0355 |
| 2020/0031142 | A1 | 1/2020 | Izawa et al. | |
| 2024/0300255 | A1* | 9/2024 | Oliva Ventayol | B41F 16/02 |

FOREIGN PATENT DOCUMENTS

| | | | |
|---|---|---|---|
| DE | 2363542 | A1 | 8/1974 |
| EP | 3587974 | A1 | 1/2020 |
| KR | 10-0929803 | B1 | 12/2009 |

OTHER PUBLICATIONS

Claims of CN211616969.*
Description of CN211616969.*
Patent Family of application.*
WO_2022203681.*

* cited by examiner

SUBLIMATION OF PRINTED TEXTILE MEDIA

BACKGROUND

Sublimation printing processes may be used to print and fix images on a textile material. The process may involve depositing a sublimating printing substance on the textile material and applying heat to cause the sublimation of the substance and its diffusion into the fibers of the textile material. When the temperature descends, the sublimating printing substance returns to solid state and remains integrated in the fibers of the textile material.

BRIEF DESCRIPTION

Examples will now be described, by way of non-limiting example, with reference to the accompanying drawings, in which.

Figure 1:
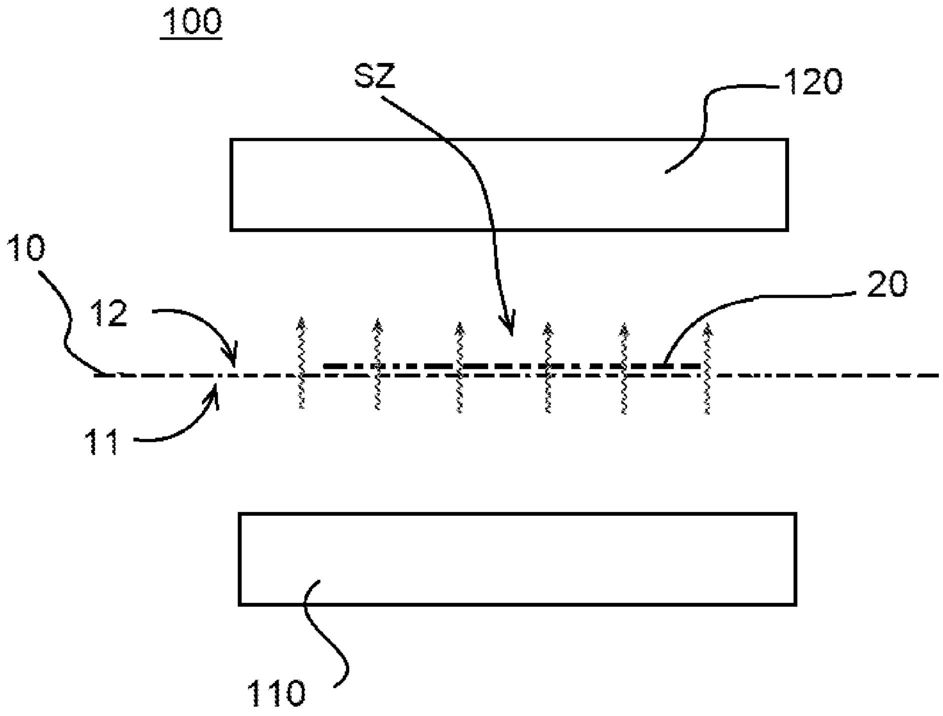
FIG. 1 is a schematic diagram of an apparatus for sublimating a printed textile medium according to an example.

For clarity reasons, not all the elements of example systems for sublimating a printed textile medium are illustrated in the drawings. Furthermore, the drawings are schematic and generally not to scale, and do not define the precise proportions of the illustrated elements.

DETAILED DESCRIPTION

The present disclosure presents examples of methods and apparatus for sublimating a printed textile medium, e.g. a fabric product, a garment such as a T-shirt, or other. Example methods and apparatus disclosed herein apply a direct sublimation process, where a sublimating printing substance is directly deposited on the textile medium, e.g. from a fluid ejection device, and is sublimated on the printed textile medium by applying heat.

A sublimating printing substance is a substance that becomes gaseous above a sublimation temperature. The sublimating printing substance may be a substance that is solid below the sublimation temperature and becomes gaseous above the sublimation temperature. For example, the sublimating printing substance may be a sublimation dye. The sublimating printing substance may be included in a printing fluid, which can be ejected by a fluid-ejecting device such as for example an inkjet printhead. The printing fluid may be liquid (e.g. in the form of an ink) and may include a suspension of sublimating printing substance particles, e.g. sublimation dye particles.

In sublimation printing, the sublimating printing substance, e.g. included in a print fluid, is deposited on a textile medium to form a pattern or image. The printed textile medium is then heated at or above the sublimation temperature, so the sublimating printing substance is converted to gas and permeates the fibers of the textile medium. The gas is subsequently converted back to a solid state when the temperature decreases, and the sublimating printing substance is thus absorbed and integrated into the fibers of the textile medium.

The sublimation temperature of the sublimating printing substance may be selected depending on a printing substrate on which it is to be deposited. For example, the sublimation temperature may be below the melting point of the printing substrate, e.g. the textile medium, or constituents thereof. The sublimation temperature may also be a temperature at which the printing substrate, or its constituents, exhibit a relatively high rate of absorption of the sublimating printing substance. The sublimating printing substance may be provided in various different colors for printing on the textile medium.

The sublimation temperature of the sublimating printing substance may for example be in the range between 180° C. and 220° C.

Textile media on which sublimation printing may be performed with example methods and apparatus according to the present disclosure for sublimating the printed textile medium may comprise different kinds of fabric and materials, for example polyester fabric, which is at least partially air permeable so that heated air may pass through it. Such textile media may be in the form of garments (e.g. t-shirts) or textile articles such as flags, cushion covers or other.

With reference to the attached drawings, various implementations of methods and apparatus for sublimating a printed textile medium, i.e. for sublimating a sublimating printing substance that has been printed or otherwise deposited on the textile medium, will now be described, which allow a simple and cost-effective configuration of the apparatus, while reducing the risk of defects, e.g. ghosting, on the printed textile medium. Examples of apparatus and methods disclosed herein also enable efficient extraction of vapors from the sublimation process, as well as filtering of the vapors, if convenient.

Referring to FIG. 1, there is shown a very schematic illustration of an apparatus 100 for sublimating a printed textile medium, according to an example. The apparatus 100 may comprise a heating device 110 to generate heating energy on a first side 11 of a printed textile medium 10, and a suction device 120 to apply a negative pressure on a second side 12, of the printed textile medium 10.

The negative pressure applied by the suction device 120 induces a flow of heated air from the heating device 110 through the printed textile medium 10, as indicated by the arrows in FIG. 1, whereby the heated air causes the sublimation of a sublimating printing substance 20 which is present on the printed textile medium 10.

The second side 12 of the printed textile medium 10 may also be referred to as the print side 12, as the sublimating printing substance is deposited on this side. The first side 11 of the printed textile medium 10 may also be referred to as the back side 11. The suction device 120 may therefore be on the print side 12 of the printed textile medium 10, so the negative pressure is generated on the printed textile medium 10 from the print side 12 thereof: in other words, air heated by the heating device 110 on the back side 11 of the printed textile medium 10 is suctioned from the print side 12 of the printed textile medium 10, so as to flow through the printed textile medium 10 and towards the suction device 120.

The provision of the suction device 120 on the side of the printed textile medium opposite the heating device 110 results in a simple and resistant structure, with no hardware, e.g. fans or other impellers, exposed to the heat from the heating device 110, and with a simplified electronic system.

Furthermore, the position of the suction device 120 causes the sublimation process to happen from the back side 11 of the printed textile medium 10 towards the print side 12 during the application of the vacuum or negative pressure by the suction device 120: particles of the sublimating printing substance that sublimate into gas are therefore efficiently suctioned and removed by the suction device, thereby reducing the risk that they return to the printed textile medium and cause a defect in the image, known as ghosting.

The suction device 120 may also remove the vapors of the sublimation process at the same time, with no additional elements. In some examples, it may be provided with a suitable filter (not shown) to capture particles, vapor and smoke from the air flow before releasing it into the atmosphere.

In some examples, the sublimating printing substance 20 may be previously deposited on the textile medium 10, e.g. on the second side 12 of the textile medium 10. The sublimating printing substance 20 may be ejected from a fluid-ejection device (not shown), such as an inkjet printhead, to be deposited on the textile medium 10.

In some examples, a fluid ejection device may be part of the apparatus 100, or other example apparatus disclosed herein. In some examples, the textile medium may be printed with the sublimating printing substance in a printing apparatus, and subsequently placed in the sublimation zone SZ of the apparatus 100 to sublimate and fix the sublimating printing substance. In other examples, a fluid ejection device may be handheld and operated by the user once the textile medium is in the sublimation zone SZ of the apparatus 100, or before placing the textile medium the sublimation zone SZ. The sublimating printing substance 20 may be deposited e.g. forming a predefined pattern or image, and may e.g. comprise several colors.

In some implementations, the printed textile medium 10 may be laid on a substantially horizontal plane, and the print side 12 with the sublimating printing substance 20 may be facing upwards. The suction device 120 may therefore be above the printed textile medium, and the heating device 110 may be below the printed textile medium 10. The printed textile medium 10 may be laid on a frame or support between the suction device 120 and the heating device 110.

Still with reference to FIG. 1, the apparatus 100 may comprise a sublimation zone SZ, where the printed textile medium 10, with the sublimating printing substance 20, is to be positioned during the sublimation process, i.e. during the process of inducing the flow of heated air from the heating device 110 through the printed textile medium 10 to cause the sublimation of the sublimating printing substance 20.

In some implementations, the sublimation zone SZ may be defined adjacent the heating device 110, e.g. at a predetermined distance above the heating device 110. The sublimation zone SZ may extend substantially in correspondence with the heating device 110, i.e., it may extend over an area that may be heated by the heating device to achieve the sublimation of a sublimating printing substance present in the sublimation zone SZ. The sublimation zone may be at a short distance from the heating device 110. For example, the sublimation zone SZ may be at a distance of between 5 mm and 25 mm from the heating device 110.

In examples, the sublimation zone SZ may have approximately the same dimension as the heating device 110, in a plane parallel to the plane of the printed textile medium 10, i.e., it may have the same cross-sectional area. In some examples, to facilitate a uniform temperature and/or suitable velocity distribution of the air flow over the sublimation zone SZ, the cross-sectional area of the sublimation zone may be bigger or smaller than the cross-sectional area of the heating device 110, e.g. up to 20% bigger or smaller in some examples.

The sublimation zone SZ of the apparatus defines the maximum area where the sublimating printing substance 20 may be sublimated on the textile medium 10 at the same time. In operation, at least a portion of the printed textile medium 10 bearing the sublimating printing substance 20 is positioned in the sublimation zone SZ. In some case the sublimating printing substance 20 may be present on a smaller area of the textile medium 10 and occupy a part of the sublimation zone SZ.

Example apparatus according to the present disclosure may comprise a support for maintaining in the sublimation zone SZ at least the portion of the printed textile medium 10 bearing the sublimating printing substance 20. The sublimation zone SZ may be defined by an upper side of the support.

In implementations, the support may have several configurations, e.g. a frame, grid, mesh, perforated plate, or other, to stretch, hold, lay flat, or otherwise support the printed textile medium as convenient for the sublimation process while allowing a flow of air to pass through the printed textile medium 10. The support may comprise holding elements to clip or clamp the printed textile medium.

In some examples the support may have approximately the same dimension, i.e., approximately the same length and width, as the sublimation zone SZ, or it may extend beyond the sublimation zone SZ. The support may be to hold a portion of the printed textile medium stationary in the sublimation zone SZ throughout the sublimation process.

In some implementations the apparatus may have no support, e.g., the support for the printed textile medium 10 may be external to the apparatus and not form a part of the apparatus, or the printed textile medium 10 may be laid on the surface of the heating device 110.

In some implementations, the suction device of an example apparatus according to the present disclosure may comprise a suction cover connectable to a vacuum source and to be placed on the sublimation zone, at least to perform a sublimation process in the apparatus. In some examples, a suction cover may be smaller than the sublimation zone and displaceable with respect to the sublimation zone. In some examples, such a suction cover may have a dimension of between 5% and 50% of the surface area of the sublimation zone, for example between 10% and 25%. Some implementations of such a suction cover are described in more detail later on.

In some implementations of example apparatus 100 and of other apparatus for sublimating a printed textile medium according to the present disclosure, some of which are described in more detail below, the heating device may comprise one or more resistive electric heating elements, through which an electrical current may be passed to heat each heating element, and which may for example comprise metal, a metallic alloy, a ceramic or a combination thereof, having an electric resistance with a positive temperature coefficient, e.g. with an electric resistance that increases with increasing temperature, for example a ceramic comprising barium titanate or lead titanate. Such heating elements may self-regulate their temperature, so that they heat up towards a stable temperature and remain substantially at the stable temperature once reached. The heating element may self-regulate its temperature by self-regulating the power consumption of the heating element to reach the stable temperature. As the temperature of the heating element increases, the electrical resistance of the heating element may increase and the heating element may draw less electrical power, at a given potential difference. The heating element may regulate its power consumption to reach the stable temperature. When the stable temperature is reached, the resistance of the heating element may have increased such that a lower amount of electrical power is drawn to maintain the heating element at the stable temperature.

In some such implementations, the heating device may comprise a self-regulating positive temperature coefficient ceramic heater (PTC), which may e.g. be powered at 220 VAC.

The stable temperature for which a heating element is designed may depend in each case on the sublimating printing substance and/or the textile medium. In some examples, the stable temperature of heating elements of the heating device according to the present disclosure may be between 180° C. and 220° C. In some examples, the stable temperature of the heating elements may be between 200° C. and 220° C., which may be suitable for e.g. polyester fabrics.

The use of a self-regulating positive temperature coefficient ceramic heater (PTC) in the heating device of an apparatus according to the present disclosure simplifies the electronics of the apparatus, since the sublimation process temperature may be maintained by the heating device itself, even without an electronic controller.

In some examples, the heating device may comprise a heating grid, e.g. a rectangular grid, formed by a plurality of heating elements.

In some examples the heating device may comprise a PTC and an air retaining device (not shown) with a physical structure allowing holding or retaining air. The air retaining device may be in thermal contact with the heating elements so that air retained in the air retaining device is heated by the heat generated by the self-regulating heating elements. The air retaining device may comprise a plurality of parallel plates or fins, of a thermally conductive material, e.g. aluminum or other metals, graphene, or other, in thermal contact with one another, and/or a reservoir which retains air by at least partially enclosing a volume of space. The heat generating device may thus accumulate heat until the described stable temperature is reached.

In some examples, after the stable temperature is reached and when a sublimation process is to be carried out on a printed textile medium 10 in the apparatus, e.g. apparatus 100 of FIG. 1, suction device 120 may be operated to urge heated air to leave the heating device 110 and to cause a heated air flow through the printed textile medium 10. After the sublimation process, the electrical resistance of a PTC heating element is briefly cooled (e.g. during a few seconds), and a peak of power consumption may occur. However, after the suction device is stopped the power consumption returns to lower levels.

In other implementations, a heating device for an example apparatus as disclosed herein may comprise inductive heating elements, and/or may comprise a circulating a heating medium, e.g. a hot fluid, or may burn a heating substance, e.g. natural gas.

Figure 2:
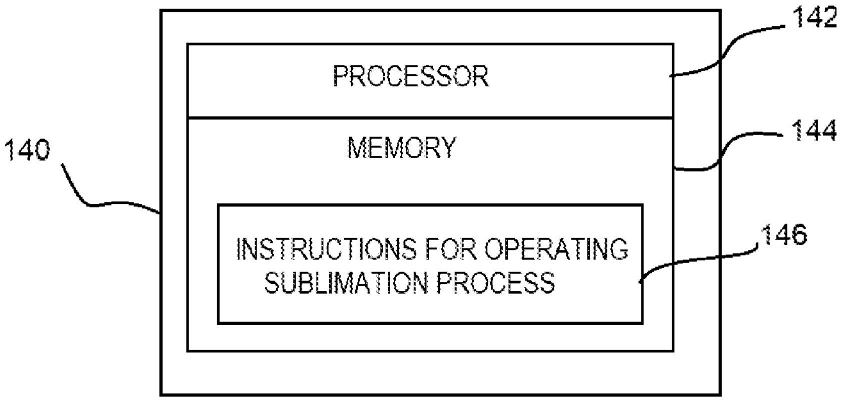
FIG. 2 is a block diagram of a controller according to one example.

In some examples, an apparatus for sublimating a printed textile medium as disclosed herein comprises a controller, such as controller 140 shown in FIG. 2, which may generally control the operation of at least part of the apparatus. It may comprise a processor 142 coupled to a memory 144. The memory 144 may store instructions 146 for the operation of a sublimation process. When executed by the processor 142, instructions 146 may control at least part of the apparatus 100 of FIG. 1, for example the heating device 110 and/or the suction device 120, to cause sublimation of a sublimating printing substance 20 that is on a printed textile medium 10, e.g. as described in method examples below. Controller 140 may be part of the apparatus 100.

An example method 300 for sublimating a sublimating printing substance on a printed textile medium, i.e., for sublimating a printed textile medium, according to the present disclosure, will now be described with reference to FIG. 3. Example method 300, and other example methods disclosed below, may be performed at least in part with apparatus 100 of FIG. 1 or with other example apparatus described herein.

Example method 300 comprises: at 310, depositing a sublimating printing substance 20 on a print side 12 of a textile medium 10; at 320, positioning the textile medium 10 in correspondence with heating device 110, with the print side 12 facing away from the heating device 110. Once the textile medium 10 is positioned in correspondence with the heating device 110 and has the sublimating printing substance 20 on it, the method comprises, at 330, causing a negative pressure on the side of the textile medium 10 that is opposite to the heating device 110, i.e., on the print side of the textile medium 10, to cause heated air to flow through the textile medium 10 thereby sublimating the sublimating printing substance 20 on the textile medium 10. The negative pressure may be generated by suctioning air from the print side of the textile medium 10, i.e., the side that is opposite to the heating device 110.

Figure 3:
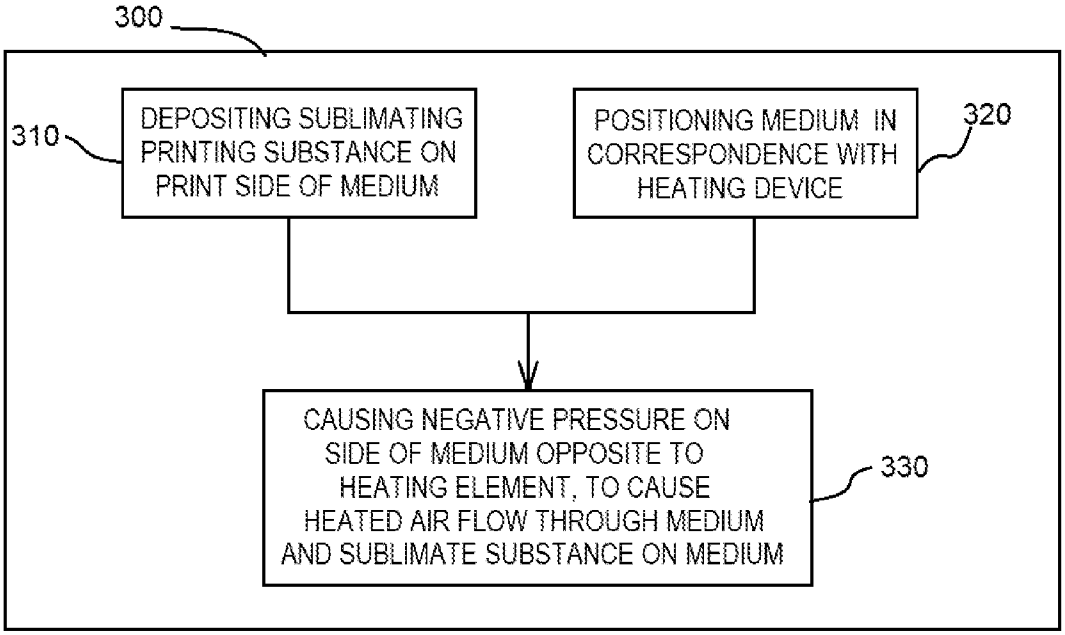
FIG. 3 is a flow diagram outlining an example method for sublimating a printed textile medium.

In implementations of example method 300 of FIG. 3, the sublimating printing substance 20 may be deposited on the textile medium 10 before the textile medium 10 is positioned in correspondence with the heating device 110: e.g., this may be done before the textile medium is introduced into the apparatus 100, or at least before it is positioned in correspondence with the heating device 110. In other implementations of example method 300 of FIG. 3, the sublimating printing substance 20 may be deposited on the textile medium 10 after the textile medium 10 is positioned in correspondence with the heating device 110, for example laid or stretched on a support: this may be done for instance with a suitable depositing device, such as a fluid ejection device (not shown in the figures) that may be mounted in the apparatus 100, e.g., above the sublimation zone SZ.

Implementations of example method 300 and of other methods for sublimating a sublimating printing substance on a printed textile medium according to the present disclosure, some of which are described in more detail below, may comprise heating the air flow in the heating device 310 to a temperature at or above a sublimation temperature of the sublimating printing substance.

For example, the air flow may be heated by the heating device 310 to a temperature that is between 20° C. and 150° C. above the sublimation temperature of the sublimating printing substance, such that a temperature of the air flow when passing through the print medium is still above the sublimation temperature.

In an example, the stable temperature of the heating device 310 may be between 190° C. and 220° C., such that when the air flow is induced by applying a negative pressure with the suction device 320, the textile medium 10 positioned in the sublimating zone SZ may reach a temperature of at least 190° C., suitable to sublimate the sublimating printing substance, in a very short time, i.e., about 2 seconds. The complete sublimation process may happen in a short time of between 3 to 10 seconds, for example 3 to 5 seconds, although the time may vary depending e.g. on the thickness and porosity of the textile medium 10, the distance between heating element and textile medium, and other factors.

In some implementations of example methods disclosed herein, a negative pressure may be applied on the side of the printed textile medium 10 that is opposite to the heating device, e.g. the print side of the printed textile medium, as described, during between 3 and 10 seconds, for example between 3 and 6 seconds. The negative pressure may be to cause a heated air flow with a speed between 0.1 m/s and 12 m/s before passing through the printed textile medium.

Figure 4B:
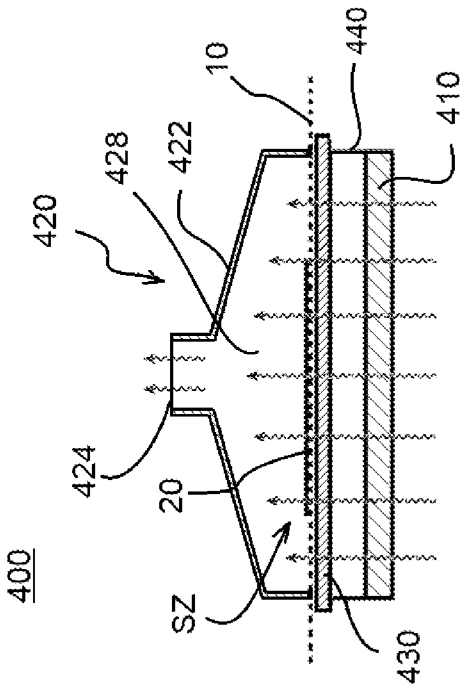
FIG. 4B is a schematic cross section view of an example apparatus for sublimating a printed textile medium, in an operational condition.
Figure 4A:
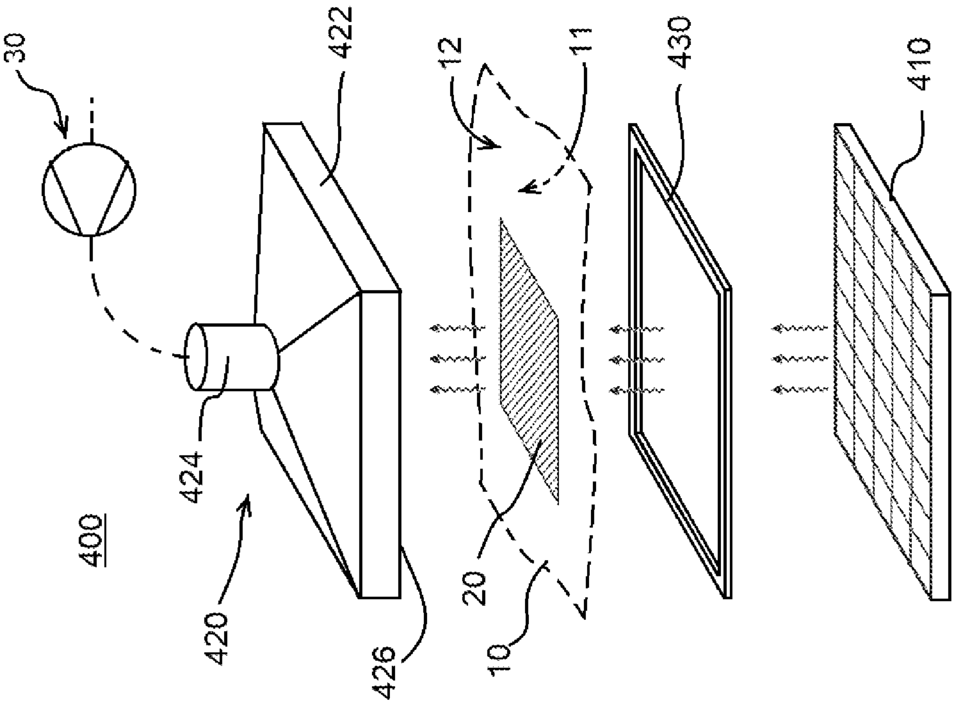
FIG. 4A is a simplified illustration showing in perspective and exploded view an example apparatus for sublimating a printed textile medium according to an implementation.

An example apparatus 400 for sublimating a sublimating printing substance on a printed textile medium, according to an implementation, is now described in more detail with reference to FIGS. 4A and 4B, where FIG. 4A shows an apparatus 400 in exploded view, and FIG. 4B is a cross section view of an apparatus 400 once assembled and in operational condition, e.g., while performing a sublimation process.

As shown, e.g., in FIG. 4A, in some examples the apparatus 400 comprises a heating device 410, a support 430 for the printed textile medium 10, above the heating device 410, and a suction device 420 at least partly above the support 430. Arrows in FIGS. 4A and 4B illustrate a flow of air between the heating device 410 and the suction device 420 and passing through the printed textile medium 10. The printed textile medium 10 has a sublimating printing substance 20 deposited on a portion of its print side 12.

In FIG. 4A the support 430 is depicted schematically as a frame, but it may have any other suitable configuration to hold the printed textile medium 10 above the heating device 410 while allowing the flow of air through the printed textile medium 10. For example, the support 430 may comprise a grid, mesh or perforated plate on which the back side 11 of the printed textile medium 10 may rest.

In some examples, the heating device 410 may comprise a self-regulating positive temperature coefficient ceramic heater (PTC). In examples, the structure and operation of the heating device 410 may be as described in detail above.

As shown in FIGS. 4A and 4B, the suction device 420 of apparatus 400 may comprise a suction cover 422 to be placed, at least during operation, on the sublimation zone SZ, for example substantially covering the sublimation zone SZ. When the printed textile medium 10 and heating device 410 are substantially horizontal, as in the example of FIGS. 4A and 4B, the suction cover 422 is placed above the sublimation zone SZ, at least when a sublimation process takes place in the apparatus.

The suction cover 422 may take an operational position in which it is close to the support 430 and the printed textile medium, and substantially closes a sublimation zone SZ, such as the position shown in FIG. 4B, and may take an open position in which it allows access to the support 430 and to the printed textile medium 10. For example, the suction cover 422 may be removable from the apparatus 400 or may be hinged to a structure of the apparatus 400, or other.

The suction cover 422 is to be connected through a conduit 424 to a vacuum source 30, as shown schematically by the dashed line in FIG. 4A. The vacuum source 30 may e.g. be a vacuum pump and may be part of the apparatus 400, or it may be an external vacuum source.

In some examples, and as also illustrated in FIGS. 4A and 4B, the suction cover 422 has a dimension spanning the whole sublimation zone SZ of the apparatus 400: that is, the perimeter of the lower edge 426 of the suction cover 422 encompasses a surface area equal to or larger than the sublimation zone SZ. The lower edge 426 of the suction cover 422 may have any suitable shape, e.g., rectangular, round, elliptical, or other. The shape of the lower edge 426 of the suction cover 422 may generally be similar to the shape of the heating device 410, and the lower edge 426 of the suction cover 422 may encompass a surface area equal to or larger than the active surface area of the heating device 410, i.e., the surface area from which a heated air flow may be generated.

In implementations of an apparatus 400 such as described above, when the suction cover 422 is the operational position illustrated in FIG. 4B the suction cover 422 may contact the printed textile medium 10, such as to enclose the sublimation zone SZ and substantially isolate it from the surrounding ambient air, i.e., defining a suction space or suction chamber 428 between the sublimation zone SZ and the suction cover 422. This may improve the efficiency of the sublimation process by preventing or at least reducing the suction of cold ambient air between the printed textile medium 10 and the lower edge 426 of the suction cover 422, towards the sublimation zone SZ.

For example, in the operational position of the suction cover 422 the lower edge 426 may contact the printed textile medium 10 all around the perimeter of the lower edge 426 and press it against the support 430. The shape of the support 430 may be suitable to receive and bear the lower edge 426 of the suction cover 422.

In some examples, the apparatus 400 may also comprise a housing 440 laterally enclosing the space between the heating device 410 and the portion of the printed textile medium 10 placed in the sublimation zone SZ, as shown in FIG. 4B. This may substantially prevent cold ambient air from being suctioned and flow through the printed textile medium 10 without flowing through the heating device 410. The housing 440 may be a separate part of the apparatus 400 or may be part of heating device 410 and/or of the support 430. In some examples the heating device 410 and the support 430 may be an integral assembly, including a lateral enclosure between them.

Examples of an apparatus 400 as disclosed enable efficient sublimation of the sublimating printing substance with a relatively low power consumption, as the suction device 120 suctions no cold air from the environment, but just the heated air flowing through the print medium 10.

An example method 500 for sublimating a sublimating printing substance on printed textile media, according to the present disclosure, will now be described with reference to FIG. 5. Example method 500 may be performed at least in part with apparatus 400 of FIGS. 4A and 4B, or by other example apparatus which are described herein.

Example method 500 comprises: at 510, depositing a sublimating printing substance 20 on a print side 12 of a textile medium 10; at 520, positioning the printed textile medium 10 in correspondence with heating device 410, and e.g., with the print side 12 facing away from the heating device 410; and at 530, causing a negative pressure simultaneously on all the portion of the printed textile medium 10 on which the sublimating printing substance 20 is deposited, for instance on all the sublimation zone SZ, by suctioning air from the print side 12 of the printed textile medium 10, to cause heated air to flow through the printed textile medium 10 thereby sublimating the sublimating printing substance 20 on the printed textile medium 10.

In some implementations, example method 500 may also comprise, at 525, enclosing a space adjacent the print side 12 of the printed textile medium 10, the enclosed space spanning all the sublimating printing substance, for instance spanning the whole sublimation zone SZ, such as suction chamber 428 of FIG. 4B. In this case, the negative pressure is generated at 530 by suctioning air from the enclosed space.

Figure 5:
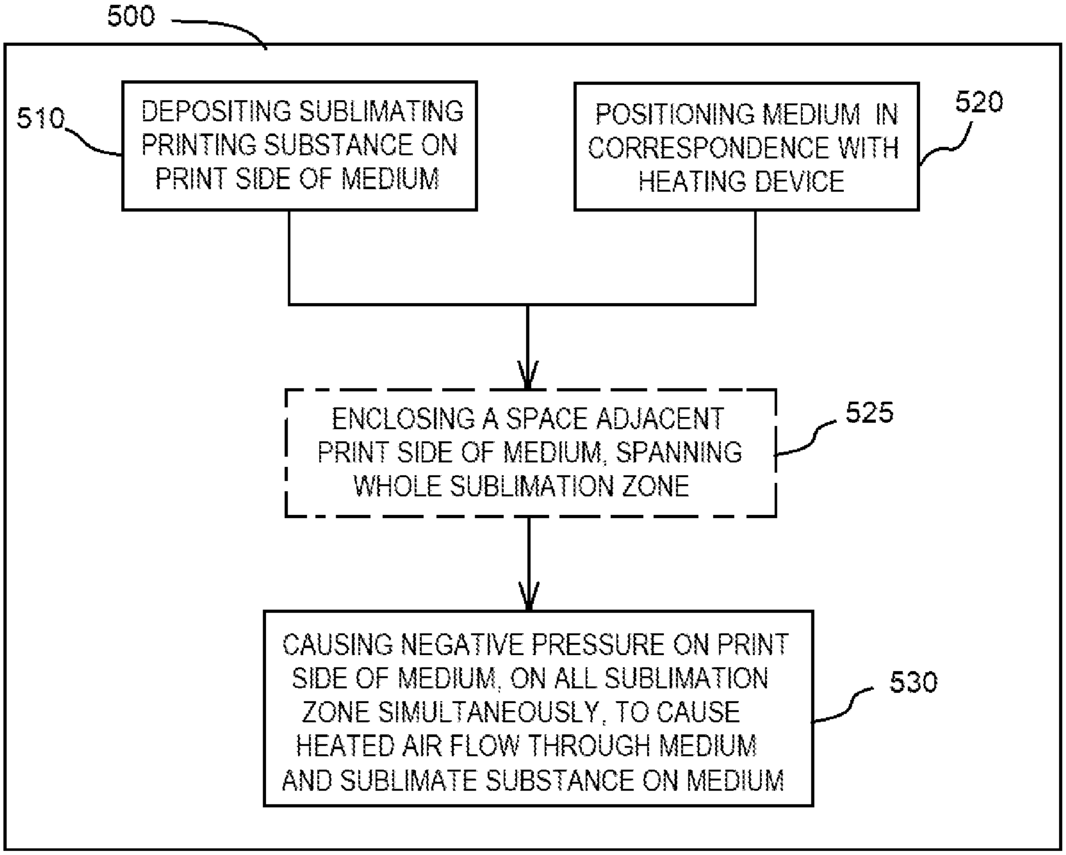
FIG. 5 is a flow diagram outlining an example method for sublimating a printed textile medium.

As disclosed above for example method 300, in implementations of example method 500 of FIG. 5 the sublimating printing substance 20 may be deposited on the textile medium 10 before the textile medium 10 is positioned in the sublimation zone SZ, or once the textile medium 10 is positioned as shown in FIG. 4B, i.e., laid on the support 430, and before placing the suction cover in the operating position of FIG. 4B.

Figure 6B:
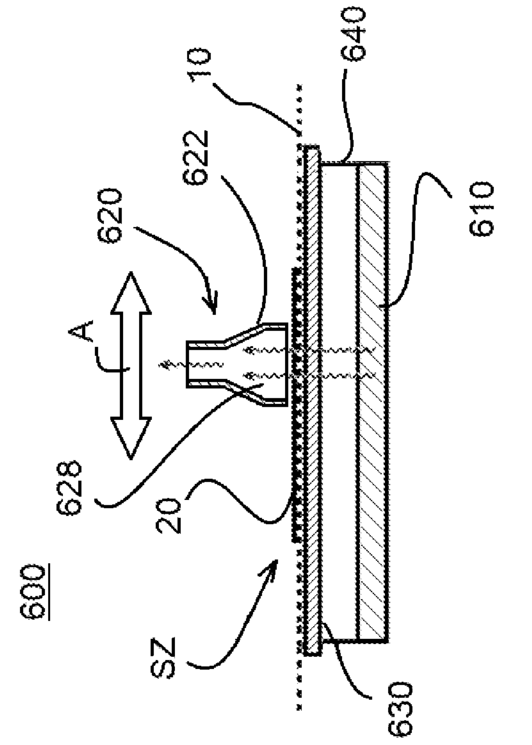
FIG. 6B is a schematic cross section view of an example apparatus for sublimating a printed textile medium, in an operational condition.
Figure 6A:
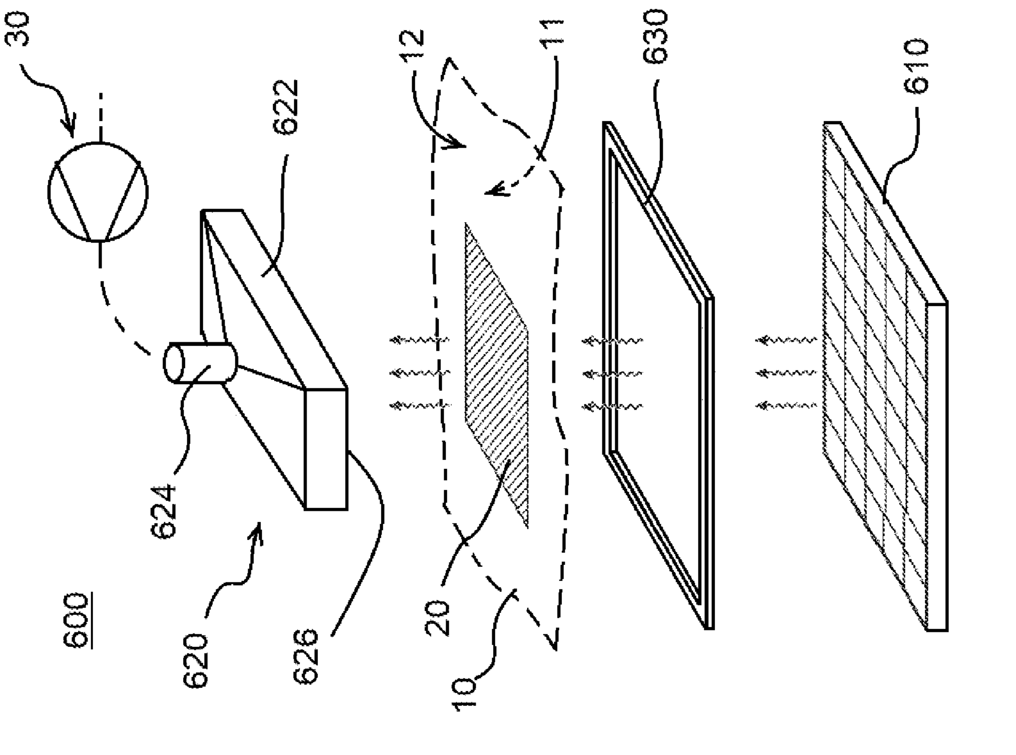
FIG. 6A is a simplified illustration showing in perspective and exploded view an example apparatus for sublimating a printed textile medium according to another implementation.

An example apparatus 600 for sublimating a printed textile medium, according to an implementation, is now described in more detail with reference to FIGS. 6A and 6B, where FIG. 6A shows an implementation of example apparatus 600 in exploded view, and FIG. 6B is a cross section view of an apparatus 600 in operational condition, e.g., during a sublimation process.

As shown, e.g., in FIG. 6A, in some examples the apparatus 600 comprises a heating device 610, a support 630 for the printed textile medium 10, above the heating device 610, and a suction device 620 which may be placed, at least in part, above the support 630. Arrows in FIGS. 6A and 6B illustrate a flow of air between the heating device 610 and the suction device 620 and passing through the printed textile medium 10. The printed textile medium 10 has the sublimating printing substance 20 deposited on a portion of its print side 12.

As in the case of example apparatus 400 described above, the support 630 may have any suitable configuration for holding the printed textile medium 10 above the heating device 610 and allowing the flow of air through the printed textile medium 10. In some examples, the heating device 610 may comprise a self-regulating positive temperature coefficient ceramic heater (PTC). In examples, the structure and operation of the heating device 610 may be as described in detail above.

The suction device 620 of apparatus 600 may comprise a suction cover 622 connectable through a conduit 624 to a vacuum source 30, which may e.g. be a vacuum pump. The vacuum source 30 may be part of the apparatus 600 or may be an external vacuum source.

The suction cover 622 is to be placed on the sublimation zone SZ, e.g. above the sublimation zone SZ, at least during operation of the apparatus. In some implementations of example apparatus 600, the suction cover 622 has a dimension that is smaller than the sublimation zone SZ of the apparatus 600, i.e., the suction cover 622 covers a surface area that is smaller than the surface area of the sublimation zone SZ. The perimeter of a lower edge 626 of the suction cover 622 thus encompasses a surface area that is smaller than the size of the sublimation zone SZ.

In some implementations, the suction cover 622 may have a substantially elongate shape. For example, if the sublimation zone SZ of the apparatus 600 is substantially rectangular as in FIGS. 6A, 6B (where the sublimation zone SZ may be similar in size and shape to that of the heating device 610) the suction cover 622 may have a substantially rectangular and elongate shape as shown in FIG. 6A, with a length that is equal to or larger than a length of the sublimation zone SZ, and a width that is smaller than a width of the sublimation zone SZ.

In some examples, the suction cover 622 may have a dimension, i.e., a surface area spanned by the lower edge 626 of the suction cover 622, of between 5% and 50% of the surface area of the sublimation zone SZ, for example between 10% and 25%.

In some implementations of apparatus 600, the suction cover 622 and the printed textile medium 10, or the printed textile medium support 630, may be displaceable relative to each other, as shown by arrow A in FIG. 6B. Thus, with a relative displacement between the suction cover 622 and the printed textile medium 10, a suction cover 622 having a dimension smaller than the sublimation zone SZ may progressively pass over the printed textile medium 10 across the sublimation zone SZ, to suction air and cause a negative pressure and a heated air flow through successive regions of the printed textile medium 10, and therefore may progressively sublimate on the printed textile medium 10, region by region, all the sublimating printing substance 20 in the sublimation zone SZ. In some implementations, the suction cover 622 and the printed textile medium 10 may be displaceable relative to each other parallelly to the printed textile medium 10.

Examples of a suction cover 622 of example apparatus 600 allow reducing the power consumption e.g. when a sublimation printing process is performed on a small area of the printed textile medium 10. Furthermore, as suction is applied to a small area of the printed textile medium 10, and the heated air flow through the printed textile medium is limited to this small area, a small part of the heating device 610, but not all, will cool down as a result of the air flow, and the peak of power consumption to heat again the small part that has cooled down will be relatively low: not just due to the size of the cooled part, but also due to the thermal inertia of the surrounding parts of the heater device, which will help stabilize the temperature faster.

The arrow A in FIG. 6B illustrates an example in which the printed textile medium support 630 maintains the printed textile medium 10 stationary, while the suction cover 622 is displaceable; in other examples the suction cover 622 may be fixed in the example apparatus 600, and the support 630 may be to displace the printed textile medium 10 with respect to the suction cover 622.

In the example of FIG. 6B, the suction cover 622 may be mounted on a carriage (not shown), for example a reciprocating carriage or other displaceable element, to travel across the sublimation zone SZ in the direction of arrow A, and may be provided with a motor. In some examples, the suction cover 622 may be handheld, and/or mounted displaceable on a guide or carriage and displaced by a user.

In operation, the suction cover 622 may be displaced parallel to the printed textile medium 10, e.g. parallel to the plane defined by the support 630 in FIGS. 6A and 6B, and may apply a negative pressure on the underlying printed textile medium 10 with the sublimating printing substance 20 deposited thereon. During the displacement the suction cover 622 may be maintained in an operational position wherein there is a small distance, or no distance, between the lower edge 626 of the suction cover 622 and the printed textile medium support 630, in order to minimize the flow of cold air from the sides of the suction cover 622 into a suction space or suction chamber 628 defined between the suction cover 622 and the printed textile medium 10.

In some examples, the distance between the lower edge 626 of the suction cover 622 and the printed textile medium support 630 in the operational position of the suction cover 622 and the printed textile medium 10 is close to zero, e.g. less than 2 mm, to prevent cold air from entering the suction cover 622. In some examples, a leading side of the lower edge of the suction cover 622, that passes over non-sublimated sublimating printing substance 20, may be at a distance from the printed textile medium 10. At the same time, portions of the lower edge of the suction cover that pass over parts of the printed textile medium 10 where the sublimating printing substance has already sublimated, such as for example a trailing side of the lower edge and/or end sections of the lower edge that may be out of the sublimation zone SZ during the displacement, may be closer to the printed textile medium than the leading side, i.e., they may be in contact or very close to the printed textile medium.

In an example sublimation process which may be performed with implementations of the apparatus 600, the sublimating printing substance 20 on the printed textile medium 10 is progressively sublimated on the printed textile medium 10 as the suction cover 622 is displaced over the printed textile medium causing a negative pressure and a flow of heated air through the portion of the printed textile medium 10 which is under the suction cover at each time.

In examples, the displacement of the suction cover 622 may be continuous, at a speed allowing the heated air flow to cause the sublimation of the sublimating printing substance. In other examples the displacement of the suction cover 622 may be stepwise: the suction cover may remain stationary for a predetermined time over a portion of the printed textile medium 10, e.g., a strip of the printed textile medium 10, causing sublimation of the sublimating printing substance 20 on that portion, and then may be displaced and paused over another portion, e.g. strip, of the printed textile medium 10.

In some examples, the displacement of the suction cover 622 may be carried out such that each point within the sublimation zone may spend between 3 and 30 seconds, in some examples between 5 and 15 seconds, in the heated air flow under the suction cover 622.

In some examples, an apparatus 600 may comprise a housing 640 laterally enclosing the space between the heating device 610 and the portion of the printed textile medium 10 placed in the sublimation zone SZ, as shown in FIG. 6B, to prevent cold ambient air from being drawn towards the suction chamber 628 through the printed textile medium 10.

In some example apparatus 600 in which the suction cover 622 is displaceable to progressively cause sublimation of the sublimating printing substance 20 on the printed textile medium 10 as it is displaced across the sublimation zone SZ, the displacement of the suction cover 622 and the sublimation operation may be started after all the sublimating printing substance 20 has been deposited on the printed textile medium 10.

In some examples, the suction cover 622 of an example apparatus 600 may be displaced across the sublimation zone SZ while the sublimating printing substance 20 is being deposited on the textile medium 10. For instance, the suction cover 622 may be displaced across the sublimation zone SZ following the displacement of a fluid ejection device (not shown) or other device for depositing the sublimating printing substance.

This may enable a faster sublimation printing process, with the sublimating printing substance being sublimated shortly after it is deposited and with no down times between the two operations, and better image quality, as it may avoid or reduce undesirable melting of the printing fluid with sublimating printing particles into the fibers of the textile medium 10.

Figure 7:
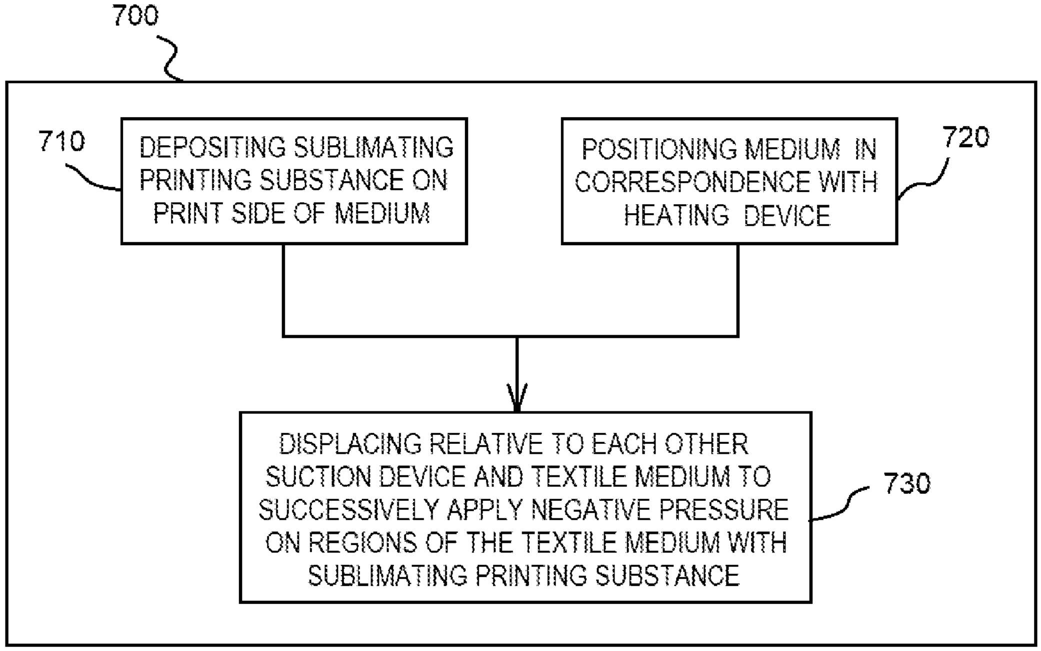
FIGS. 7 and 8 are flow diagrams outlining example methods for sublimating a printed textile medium.

An example method 700 for sublimating a sublimating printing substance on a printed textile media, according to the present disclosure, will now be described with reference to FIG. 7. Example method 700 may be performed at least in part with apparatus 600 of FIGS. 6A and 6B, or by other example apparatus according to the present disclosure.

Example method 700 comprises: at 710, depositing a sublimating printing substance 20 on a print side 12 of a textile medium 10; at 720, positioning the printed textile medium 10 in correspondence with heating device 610, with the print side 12 facing away from the heating device 610; and at 730, displacing relative to each other a suction device 620 and the printed textile medium 10 with the sublimating printing substance 20, to successively apply a negative pressure on regions of the printed textile medium 10 with the sublimating printing substance 20.

Implementations of method 700 may be performed with an example apparatus 600 in which the suction device 620 comprises a suction cover 622 with a dimension smaller than the sublimation zone SZ, as disclosed above.

As disclosed above for example methods 300 and 500, in implementations of method 700 the sublimating printing substance 20 may be deposited on the textile medium 10 before or after the textile medium 10 is positioned in the sublimation zone SZ of the apparatus.

In examples of method 700 in which the sublimating printing substance 20 is deposited on the textile medium 10 after the textile medium 10 is positioned in the sublimation zone SZ, the displacement of the suction device across the sublimation zone SZ at 730 may start while the sublimating printing substance 20 is still being deposited on the textile medium 10.

Figure 8:
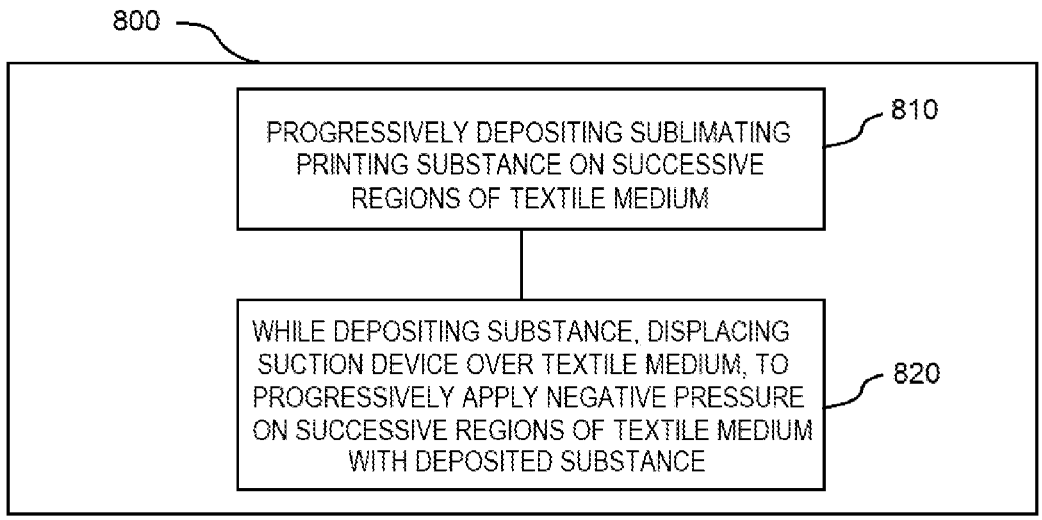

An example of a method 800 for sublimating a sublimating printing substance on printed textile media in which the displacement of a suction device across the sublimation zone SZ starts while the sublimating printing substance 20 is still being deposited on the textile medium 10 is illustrated by the flow diagram of FIG. 8.

Example method 800 may comprise, at 810, progressively depositing the sublimating printing substance 20 on successive regions of a textile medium 10 and, at 830, while the sublimating printing substance is being deposited, displacing a suction device over the textile medium 10 following the deposition of the sublimating printing substance 20, to progressively apply a negative pressure on the successive regions of textile medium 10 with the deposited sublimating printing substance 20.

In example methods 300, 500, 700, 800 it is understood that at the time a negative pressure is applied or caused from the print side 12 of the print medium 10, the heating device, such as heating device 110, 410 or 610 of example apparatus disclosed above, is in condition and/or is operated to provide a suitably heated air flow, to cause the sublimation of the sublimating printing substance 20 on the printed textile medium 10.

For example, in implementations in which the heating device 110, 410 or 610 comprises a PTC as described above, the heating device may maintain the stable temperature for which it is designed, and therefore provide a heated air flow suitable for the sublimation of the sublimating printing substance 20 when the suction device 120, 420 or 620 is operated to apply a negative pressure on the print side 12 of the printed textile medium 10.

In an example apparatus according to the present disclosure where the sublimation zone is substantially flat, the flat sublimation zone may be horizontal when in operational condition, as illustrated in FIGS. 1, 4A, 4B, 6A, 6B, but it may also be inclined at an angle.

In an example apparatus according to the present disclosure the printed textile medium support for the printed textile medium, if present, and/or the sublimation zone, may be non-flat or non-planar. For example, a printed textile medium support for the printed textile medium may comprise a three-dimensional shape, for example a cylinder or any other curved surface on which the printed textile medium may rest and/or be stretched. For example, in the case of a curved surface with a convex upper side, the suction device may be on the convex upper side, while the heating device may be on the concave lower side of the curved surface. A suction cover of a suction device may have a lower edge matching the shape of the convex upper side of the support. When the suction cover is displaceable, it may be displaceable parallelly to the printed textile medium support, following the shape thereof.

Example methods and apparatus disclosed herein may be operated at least partly under the control of controller 140 disclosed above. In some implementations, example methods and apparatus disclosed herein may also be operated manually by a user.

Although a number of particular implementations and examples have been disclosed herein, further variants and modifications of the disclosed devices and methods are possible. For example, not all the features disclosed herein are included in all the implementations, and implementations comprising other combinations of the features described are also possible.

All the features disclosed in this specification (including any accompanying claims, abstract and drawings), and/or all of the actions of any method or process so disclosed, may be combined in any combination, except combinations where at least some of such features and/or actions are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A method comprising:

depositing a sublimating printing substance on a print side of a textile medium, positioning the textile medium in correspondence with a heating device, with the print side facing away from the heating device, causing a negative pressure on the print side of the textile medium, to cause heated air to flow through the textile medium thereby sublimating the deposited sublimating printing substance on the textile medium, wherein the sublimating printing substance is deposited on the print side of the textile medium facing away from the heating device before the negative pressure is caused on the print side of the textile medium.

2. A method according to claim 1, comprising causing the negative pressure simultaneously on all the textile medium on which the sublimating printing substance is deposited.

3. A method according to claim 2, comprising:

enclosing a space adjacent the print side of the textile medium on which the sublimating printing substance is deposited, the enclosed space spanning all the sublimating printing substance, and causing the negative pressure simultaneously over all the sublimation substance by suctioning air from the enclosed space.

4. A method according to claim 1, comprising displacing relative to each other a suction device and the textile medium with the sublimating printing substance, such that a negative pressure is successively applied on regions of the textile medium with the sublimating printing substance.

5. A method according to claim 4, comprising:

progressively depositing the sublimating printing substance on successive regions of the textile medium, and while the sublimating printing substance is being deposited, displacing the suction device over the textile medium following the deposition of the sublimating printing substance, to progressively apply a negative pressure on the successive regions of the textile medium with the deposited sublimating printing substance.

6. An apparatus for sublimating a printed textile medium, the apparatus comprising:

a heating device to generate heating energy on a back side of a printed textile medium, and a suction device to apply a negative pressure on a print side of the printed textile medium, opposite to the back side, to induce a flow of heated air through the printed textile medium thereby sublimating a sublimating printing substance on the printed textile medium, the sublimating printing substance having been previously deposited on the print side of the printed textile medium before applying the negative pressure, and the print side of the printed textile medium facing away from the heating device.

7. An apparatus according to claim 6, comprising a sublimation zone between the heating device and the suction device, and a printed textile medium support for maintaining the printed textile medium in the sublimation zone.

8. An apparatus according to claim 7, the suction device comprising a suction cover connectable to a vacuum source and to be placed on the sublimation zone.

9. An apparatus according to claim 8, wherein the printed textile medium support is to maintain the printed textile medium flat on a plane in the sublimation zone with the print side of the printed textile medium upwards; the heating device is below the plane of the printed textile medium; and the suction cover of the suction device is above the plane of the printed textile medium.

10. An apparatus according to claim 8, the suction cover having a dimension to span the whole sublimation zone.

11. An apparatus according to claim 10, the suction cover being to contact the printed textile medium such as to enclose the sublimation zone.

12. An apparatus according to claim 8, wherein the suction cover has a dimension smaller than the sublimation zone, and the suction cover and the printed textile medium are displaceable relative to each other.

13. An apparatus according to claim 12, the suction cover and the printed textile medium being displaceable relative to each other parallelly to the printed textile medium.

14. An apparatus according to claim 12, wherein the printed textile medium support is to maintain the printed textile medium stationary and the suction cover is displaceable.

15. An apparatus for sublimating a sublimating printing substance on a printed textile medium, the apparatus comprising:

a support for the printed textile medium, a heating device on a first side of the support, and a suction device on a second side of the support, to cause heated air to flow through the printed textile medium thereby sublimating a sublimating printing substance on the printed textile medium, the sublimating printing substance having been previously deposited on a print side of the printed textile medium before the heated air is caused to flow through the printed textile medium, and the print side of the printed textile medium facing away from the heating device.

* * * * *